US008730442B2

(12) United States Patent
Taniguchi et al.

(10) Patent No.: US 8,730,442 B2
(45) Date of Patent: May 20, 2014

(54) LIQUID CRYSTAL DISPLAY DEVICE AND MANUFACTURING METHOD THEREOF

(75) Inventors: Jiro Taniguchi, Mobara (JP); Eiichirou Itou, Mobara (JP); Saori Sugiyama, Chosei (JP); Susumu Edo, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 361 days.

(21) Appl. No.: 12/772,247

(22) Filed: May 3, 2010

(65) Prior Publication Data

US 2010/0296019 A1    Nov. 25, 2010

(30) Foreign Application Priority Data

May 20, 2009   (JP) .................................. 2009-122372

(51) Int. Cl.
*G02F 1/1343*        (2006.01)
(52) U.S. Cl.
USPC ......................................................... 349/141
(58) Field of Classification Search
USPC ......................................................... 349/141
See application file for complete search history.

(56) References Cited

U.S. PATENT DOCUMENTS

| | | |
|---|---|---|
| 6,297,867 B1 | 10/2001 | Miyahara et al. |
| 6,950,165 B2 | 9/2005 | Matsumoto et al. |
| 2002/0171791 A1* | 11/2002 | Anno et al. .................... 349/113 |
| 2004/0145695 A1* | 7/2004 | Kurahashi et al. ............ 349/141 |
| 2006/0066795 A1* | 3/2006 | Hsu et al. ....................... 349/136 |
| 2008/0013022 A1* | 1/2008 | Ochiai et al. .................. 349/114 |
| 2008/0018815 A1* | 1/2008 | Choi et al. ....................... 349/37 |
| 2008/0024416 A1 | 1/2008 | Onogi et al. |
| 2008/0204648 A1 | 8/2008 | Tanaka et al. |
| 2008/0225195 A1 | 9/2008 | Oohara et al. |
| 2009/0103025 A1* | 4/2009 | Tanno et al. .................. 349/110 |

FOREIGN PATENT DOCUMENTS

| | | |
|---|---|---|
| CN | 101114086 | 1/2008 |
| EP | 1 813 979 | 8/2007 |
| JP | 10-268344 | 10/1998 |

* cited by examiner

*Primary Examiner* — Bumsuk Won
*Assistant Examiner* — Charles Chang
(74) *Attorney, Agent, or Firm* — Antonelli, Terry, Stout & Kraus, LLP.

(57) ABSTRACT

A TFT substrate includes drain signal lines which are connected with respective pixels, source electrodes which are connected with the drain signal lines via channel portions of transistors, and pixel electrodes which are electrically connected with the source electrodes. The pixel electrode is, further, constituted of a contact-portion electrode which is connected to the source electrode, an opening-portion electrode which is an electrode in an opening portion which is not covered with a black matrix, and a channel upper electrode which is formed so as to cover the channel portion of the transistor of the neighboring pixel. By extending the channel upper electrode to the channel portion of the neighboring pixel, an area of the pixel electrode is increased, and a line width of the opening-portion electrode is made relatively small. Accordingly, the TFT substrate can hold a stable potential.

12 Claims, 11 Drawing Sheets

LIQUID CRYSTAL DISPLAY DEVICE AND MANUFACTURING METHOD THEREOF

CROSS-REFERENCE TO RELATED APPLICATION

The present application claims priority from Japanese application JP2009-0122372 filed on May 20, 2009, the content of which is hereby incorporated by reference into this application.

BACKGROUND OF THE INVENTION

1. Field of the Invention

The present invention relates to a liquid crystal display device and a manufacturing method thereof, and more particularly to a liquid crystal display device which can enhance the brightness of a screen and a manufacturing method thereof.

2. Description of the Related Art

As a display device of an information communication terminal such as a computer or a display device of a television receiver set, a liquid crystal display device has been popularly used. The liquid crystal display device is a device which controls the alignment of the liquid crystal composition sealed between two substrates to display an image by changing the degree of optical transmissivity of liquid crystal composition.

As a method of controlling the alignment of the liquid crystal composition, there have been known a TN (Twisted Nematic) method and an IPS (In Plane Switching) method. Further, as a type of the TN (Twisted Nematic) method, there has been known a VA (Vertical Alignment) method. In the TN method and the VA method, pixel electrodes are mounted on a thin film transistor substrate (hereinafter referred to as "TFT (Thin Film Transistor) substrate"), and counter electrodes are mounted on a color filter substrate which is provided on a side opposite to the TFT substrate by way of a liquid crystal layer. The alignment of the liquid crystal composition is controlled by controlling an electric field generated between the pixel electrodes and the counter electrodes. On the other hand, in the IPS method, both pixel electrodes and counter electrodes are mounted on a TFT substrate side, and the alignment of the liquid crystal composition is controlled by controlling an electric field generated between the pixel electrodes and the counter electrodes.

FIG. 13 shows a state of arrangement of drain signal lines 801, source electrodes 802 and pixel electrodes 803 on a conventional TFT substrate 800 which makes use of the IPS method. A video signal applied to the drain signal line 801 is applied to the pixel electrode 803 electrically connected to the source electrode 802 via a channel portion 805 of a transistor. Here, counter electrodes (not shown in the drawing) which are formed on the whole surface of a display region are provided between a layer on which the pixel electrodes 803 are formed and a layer on which the source electrodes 802 are formed. The liquid crystal composition sealed in a layer above the pixel electrodes 803 is controlled such that when a voltage is applied to three divided portions of the pixel electrode 803, an electric field is generated between the three divided portions of the pixel electrode 803 and the counter electrode so that liquid crystal composition is controlled. A region indicated by symbol BM in the drawing shows a region of a black matrix which blocks light. An image is displayed due to the radiation of light through opening portions other than the black matrix region.

SUMMARY OF THE INVENTION

The pixel electrode of such a liquid crystal display device is exposed to the influence of noises generated from neighboring pixels or the like. When a potential of the pixel electrode becomes unstable by being influenced by noises, display quality of the liquid crystal display device is deteriorated.

The present invention has been made under such circumstances, and it is an object of the present invention to provide a liquid crystal display device with a TFT substrate having pixel electrodes each of which can hold a stable potential by increasing the capacitance thereof and a method of manufacturing the liquid crystal display device.

To explain the main technical features of a liquid crystal display device and a method of manufacturing the liquid crystal display device of the present invention, they are as follows.

In a liquid crystal display device which includes: gate signal lines extending in the first direction, drain signal lines extending in a second direction orthogonal to a first direction, and pixels, the pixel includes a thin film transistor constituted of a gate electrode which is connected to the gate signal line, a drain electrode which is connected to the drain signal line, a source electrode which is connected to a pixel electrode and a semiconductor layer, and a conductive layer which is located between the pixel electrode and the thin film transistor by way of an insulation film. The pixel electrode and the conductive layer are located so as to cover a channel portion of the thin film transistor when the pixel electrode and the conductive layer are projected on a plane on which the thin film transistor is formed.

In a liquid crystal display device in which gate signal lines extending in the first direction; drain signal lines extending in the second direction orthogonal to the first direction; and pixel electrodes are formed on a substrate, a thin film transistor is constituted of a gate electrode which is connected to the gate signal line, a drain electrode which is connected to the drain signal line, a source electrode and a semiconductor layer, and an insulation film, a conductive film, an insulation film and the pixel electrode are located on the thin film transistor formed on the substrate in such an order from a thin film transistor side.

Further, in a method of manufacturing a liquid crystal display device, steps of forming a thin film transistor substrate of the liquid crystal display device are constituted of the steps of: forming thin film transistors which work as switches for applying a voltage to pixel electrodes; forming a conductive layer such that the conductive layer covers a channel portion of the thin film transistor by way of an insulation film after the formation of the thin film transistors; and forming pixel electrodes which control the alignment of liquid crystal composition by applying a voltage by way of an insulation film such that the pixel electrode covers a channel portion of the thin film transistor after the formation of the conductive layer.

Further, the thin film transistor substrate of the present invention is a thin film transistor substrate which is used in a liquid crystal display device and includes: pixel electrodes which control the alignment of liquid crystal composition by applying a voltage to the pixel electrodes; thin film transistors which work as switches for applying the voltage to the pixel electrodes; and a conductive layer which is located between a layer at which the pixel electrodes are formed and a layer at which the thin film transistors are formed by way of insulation films, wherein the pixel electrode and the conductive layer are located so as to cover a channel portion which is a portion between a source and a drain of the thin film transistor when the pixel electrode and the conductive layer are projected on a surface parallel to a plane of the thin film transistor substrate.

Further, according to the liquid crystal display device of the present invention, the conductive layer is a counter electrode which covers a display region where pixels are allocated and forms a holding capacitance together with the pixel electrode.

Further, according to the liquid crystal display device of the present invention, the conductive layer is formed in a light blocking region which blocks light from boundaries of each pixels.

Further, according to the liquid crystal display device of the present invention, the thin film transistor having the channel portion applies a voltage to the pixel electrode which covers the channel portion.

Further, according to the liquid crystal display device of the present invention, the transistor having the channel portion applies a voltage to the pixel electrode located adjacent to the pixel electrode which covers the channel portion.

DESCRIPTION OF THE PREFERRED EMBODIMENTS

Figure 1:
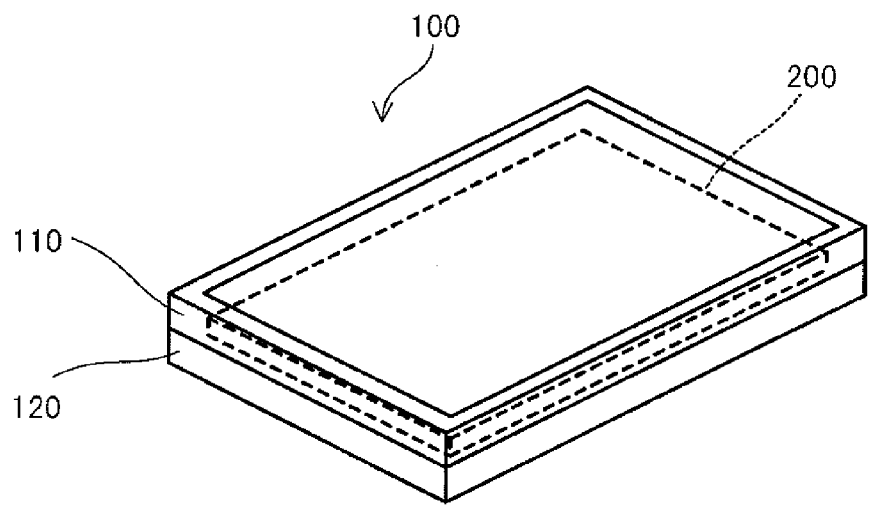
FIG. 1 is a schematic view of a liquid crystal display device according to one embodiment of the present invention.

Hereinafter, a first embodiment and a second embodiment of the present invention are explained in conjunction with drawings. Here, in the drawings, parts having identical or similar functions are given same symbols and their repeated explanation is omitted.

First embodiment

FIG. 1 schematically shows a liquid crystal display device 100 according to one embodiment of the present invention. As shown in FIG. 1, the liquid crystal display device 100 is constituted of a liquid crystal display panel 200 which is fixed such that the liquid crystal display panel 200 is sandwiched between an upper frame 110 and a lower frame 120, a backlight not shown in the drawing and the like.

Figure 2:
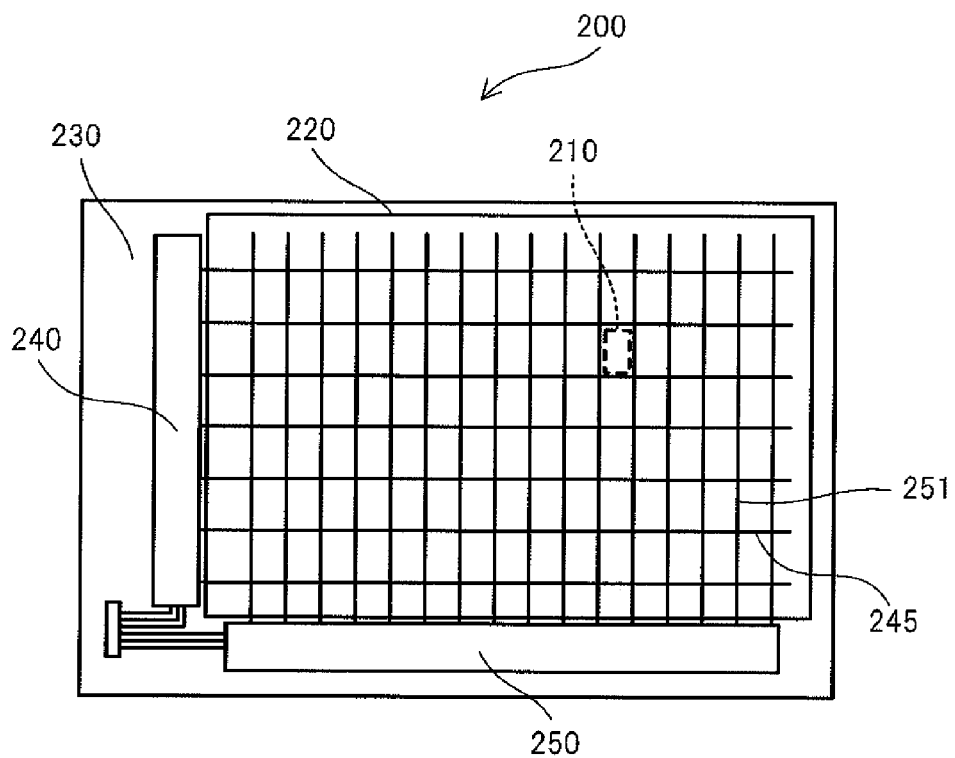
FIG. 2 is a schematic plan view showing the constitution of a liquid crystal display panel in FIG. 1.

FIG. 2 shows the constitution of the liquid crystal display panel 200. The liquid crystal display panel 200 includes two substrates consisting of a TFT substrate 230 and a color filter substrate 220, and liquid crystal composition is sealed in a space defined between these substrates. On the TFT substrate 230, gate signal lines 245 which are controlled by a drive circuit 240 and drain signal lines 251 which are controlled by a drive circuit 250 are arranged densely, and these signal lines form pixels 210 each of which functions as one pixel of the liquid crystal display device 100. Here, the liquid crystal display panel 200 has pixels 210 the number of which corresponds to the resolution of the image display. However, to prevent the drawing from becoming complicated, the constitution of the liquid crystal display panel 200 is shown in a simplified manner in FIG. 2.

Figure 3:
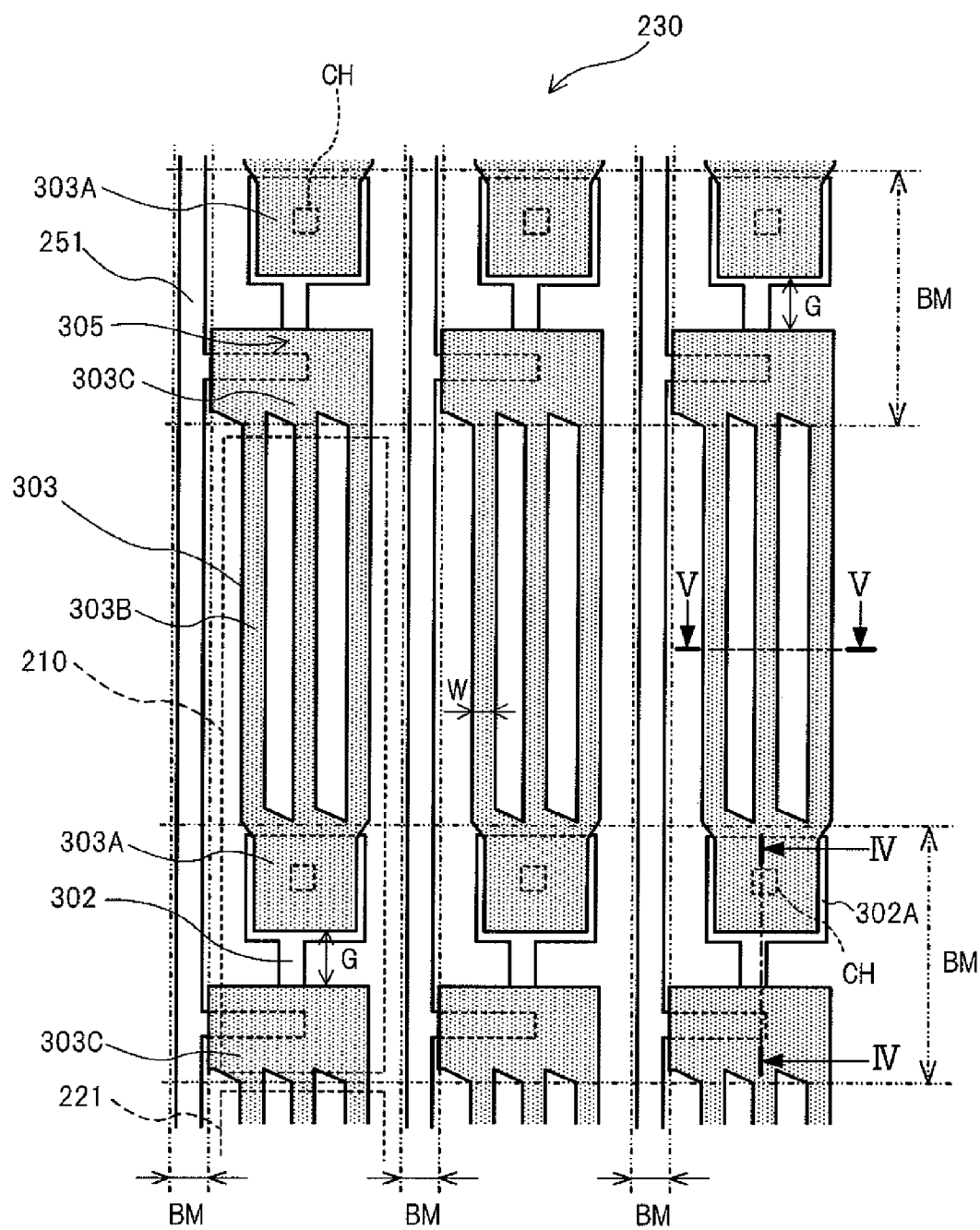
FIG. 3 is an enlarged schematic view of a TFT substrate in FIG. 2.

FIG. 3 schematically shows a pixel portion of the TFT substrate 230 in an enlarged manner. The TFT substrate 230 is a so-called IPS-type TFT substrate on which both pixel electrodes and counter electrodes are formed. The drawing shows: the drain signal lines 251 which are connected to the respective pixels 210; source electrodes 302 which are connected to the drain signal lines 251 via a channel portion 305 formed by a portion between a source and a drain of a transistor; pixel electrodes 303 which are electrically connected to the source electrodes 302; and connection portions (contact holes) CH where the source electrodes 302 and the pixel electrodes 303 are connected with each other. In the drawing, regions indicated by symbol BM are black matrix regions for blocking light, and light is radiated from opening portions other than the black matrix regions so that an image is displayed. Here, although the gate signal lines, the gate electrodes, a gate insulation film and semiconductor layers are located below the source electrodes and the drain electrodes, these parts are not shown in FIG. 3. Further, a counter electrode to which a common potential is applied is constituted of, for example, a transparent electrode made of ITO (Indium Tin Oxide) which is formed over the whole region of the TFT substrate. The counter electrode which is a conductive film formed over the whole region of the TFT substrate includes openings at positions where the contact holes CH for connecting the source electrodes 302 and the pixel electrodes 303 to each other are formed. By forming the contact holes in the opening portions of the counter electrode, it is possible to prevent the contact between the counter electrodes and the pixel electrodes.

Here, the pixel electrode 303 is constituted of a contact portion electrode 303A which is connected to the source electrode 302, an opening portion electrode 303B which is an electrode at the opening portion which is not covered with the black matrix, and a upper channel portion electrode 303C which is formed so as to cover a channel portion 305 of the transistor of the neighboring pixel. The contact portion electrode 303A is connected with the source electrode 302 via the contact hole CH. Due to such a constitution, in the pixel electrode, the upper channel portion electrode 303C extends to the channel portion of the neighboring pixel thus increasing an area of the pixel electrode 303.

The pixel electrode and the conductive layer are located so as to cover the channel portion of the transistor when the pixel electrode and the conductive layer are projected on a TFT substrate surface (or when the pixel electrode and the conductive layer are shown in a perspective view as viewed from a front surface side).

The upper channel portion electrode 303C is concealed from a person viewing the screen by the black matrix BM which is formed on the counter substrate. Accordingly, the brightness of the screen is not influenced by the upper channel portion electrode 303C and hence, it is unnecessary to form an opening portion in the upper channel portion electrode 303C thus increasing an area of the electrode.

Further, to prevent the contact portion electrode 303A from being influenced by noises generated from the upper channel portion electrode 303C of the neighboring pixel 210, the contact portion electrode 303A is located away from the upper channel portion electrode 303C of the neighboring pixel 210 by a predetermined distance.

Further, in the opening portion electrode 303B, since the area of the pixel electrode 303 is increased due to the upper channel portion electrode 303C, a line width W can be made relatively small. Although the pixel electrode 303 is formed of a transparent electrode made of ITO or the like, for example, so long as the pixel electrode 303 is formed of a film, as a matter of course, the optical transmissivity of the pixel electrode 303 is lowered. In this embodiment, the line width W can be made small and hence, a forming area of the (transparent) electrode in the opening portion can be made small thus enhancing the optical transmissivity.

The contact portion electrode 303A which connects the pixel electrode 303 and the source electrode 302 to each other is formed smaller than the source electrode contact portion 302A. This constitution is adopted for increasing a distance G between the pixel electrode of the first pixel 210 and the pixel electrode of the second pixel 221 which is located adjacent to the first pixel 210 in the extending direction of the drain signal line. The pixel electrode of the neighboring second pixel 221 is formed so as to cover the channel portion of the TFT for the first pixel 210 and hence, the pixel electrode of the first pixel 210 is made small.

Due to such a constitution, it is possible to ensure the distance G to an extent that the pixel electrode of the second pixel 221 is not influenced by a change in pixel voltage of the first pixel 210 (the second pixel 221 does not generate noises even when the pixel voltage of the first pixel 210 is changed).

Figure 4:
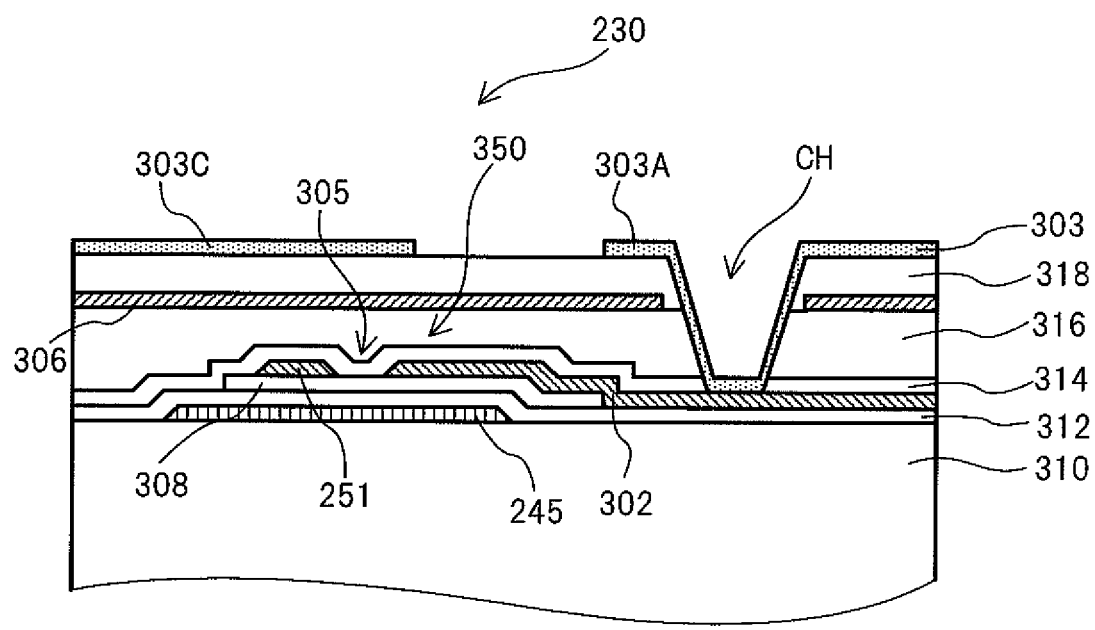
FIG. 4 is a cross-sectional view of a portion taken along a line IV-IV in FIG. 3.

FIG. 4 shows a cross-sectional view of a portion taken along a line IV-IV in FIG. 3. As shown in FIG. 4, the TFT substrate 230 is constituted of a glass substrate 310, transistors 350, an organic film 316 which is an insulation film formed on the transistors 350, a counter electrode 306 which is formed on the organic film 316, an insulation film 318 which is formed on the counter electrode 306, and the pixel electrodes 303 which are formed on the insulation film.

Further, the transistor 350 is formed of a gate signal line 245 which is formed on the glass substrate 310, an amorphous silicon layer 308, a gate insulation film 312 which is formed between the gate signal line 245 and the amorphous silicon layer 308, a drain signal line 251, a source electrode 302, and a source/drain insulation film 314 which is formed on the drain signal line 251 and the source electrode 302. Here, the source electrode 302 is connected to the contact portion electrode 303A of the pixel electrode 303.

As shown in FIG. 4, although the upper channel portion electrode 303C is located above the channel portion 305 of the transistor, the counter electrode 306 which is a conductive body is interposed therebetween and hence, the upper channel portion electrode 303C is hardly influenced by noises of the transistor. Due to the upper channel portion electrode 303C, it is possible to increase an area of the pixel electrode 303 without being influenced by noises. That is, the pixel electrode 303 can increase the capacitance thereof.

That is, the counter electrode 306 which is the conductive film is located above the channel portion 305 by way of the insulation layer. Further, a portion of the pixel electrode 303 is located above the counter electrode 306 which is the conductive film byway of the insulation film. The pixel electrode 303 of the pixel 210 is located so as to overlap the channel portion 305 of the thin film transistor which controls the neighboring pixel 210.

The manner of operation of the transistor 350 of the pixel 210 is explained hereinafter. When a video signal is applied to the drain signal line 251 of the pixel 210 which is a target pixel to be controlled by the drive circuit 250 shown in FIG. 2, and the gate signal line 245 of the pixel 210 which is a target pixel to be controlled becomes active by the drive circuit 240, the drain signal line 251 and the source electrode 302 in FIG. 4 are made conductive with each other, and a voltage of a video signal is applied to the whole pixel electrode 303 from the source electrode 302 via the contact portion electrode 303A. An electric field is generated between the opening portion electrode 303B and the counter electrode 306 thus controlling liquid crystal composition located between the TFT substrate 230 and the color filter substrate 220.

Particularly, in the IPS-type liquid crystal display device, the narrowing of the width W of the pixel electrode brings about a particularly advantageous effect.

Figure 5:
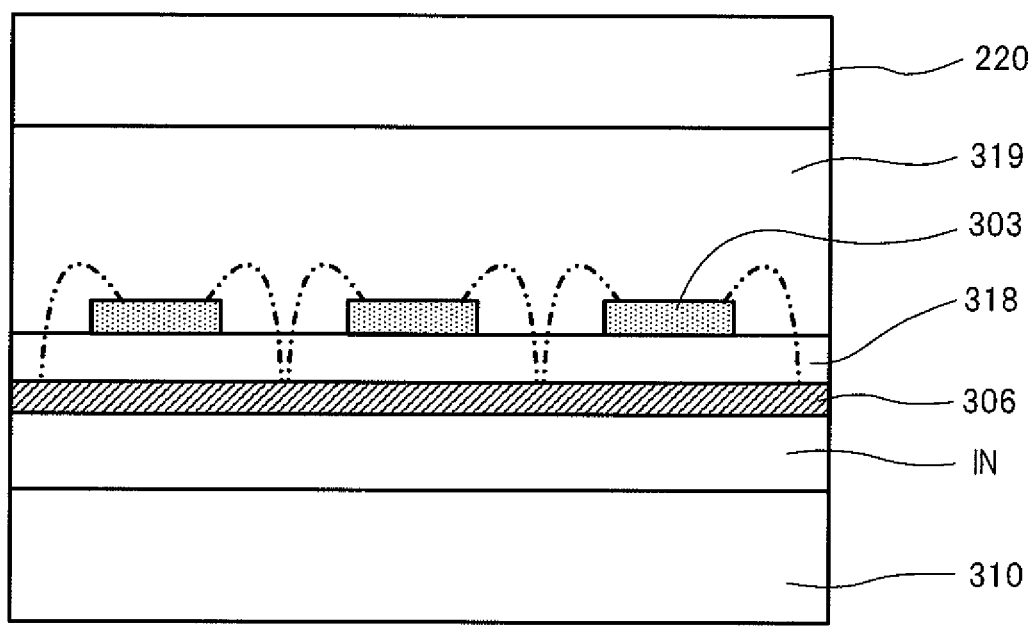
FIG. 5 is a cross-sectional view of a portion taken along a line V-V in FIG. 3.

FIG. 5 is a cross-sectional view take along a line V-V in FIG. 3. In FIG. 5, the insulation layer IN which is constituted of a plurality of insulation films is formed on the glass substrate 310. Above an upper layer of the insulation layer IN, the counter electrode 306 to which a common potential is applied, an insulation film 318, and the pixel electrodes 303 are allocated. A liquid crystal layer 319 is sandwiched between the TFT substrate 230 and the color filter substrate 220. Further, a double-dashed chained line in FIG. 5 indicates an electric field. The electric field which controls the rotation of liquid crystal is generated by the pixel electrode and the counter electrode. In the IPS-type liquid crystal display device, an ON/OFF control of light transmission is performed by rotating liquid crystal using an electric field generated in the lateral direction. Particularly, an electric field which contributes to the optical transmissivity is generated by an area in the vicinity of an edge portion of the pixel electrode and counter electrode. In an area in the vicinity of the center of the pixel electrode 303, an electric field by which it is difficult to control liquid crystal is generated compared to area in the vicinity of the edge portion of the pixel electrode.

Figure 6:
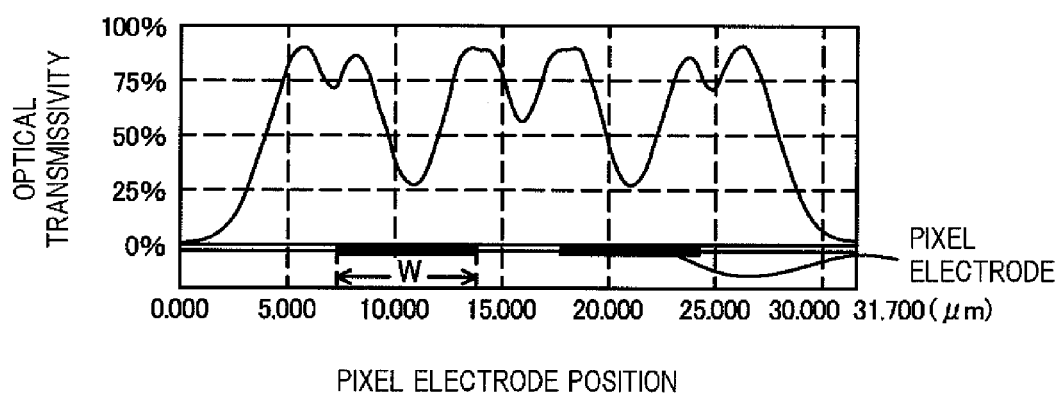
FIG. 6 is a graph showing optical transmissivity of an IPS-type liquid crystal display device.
Figure 7:
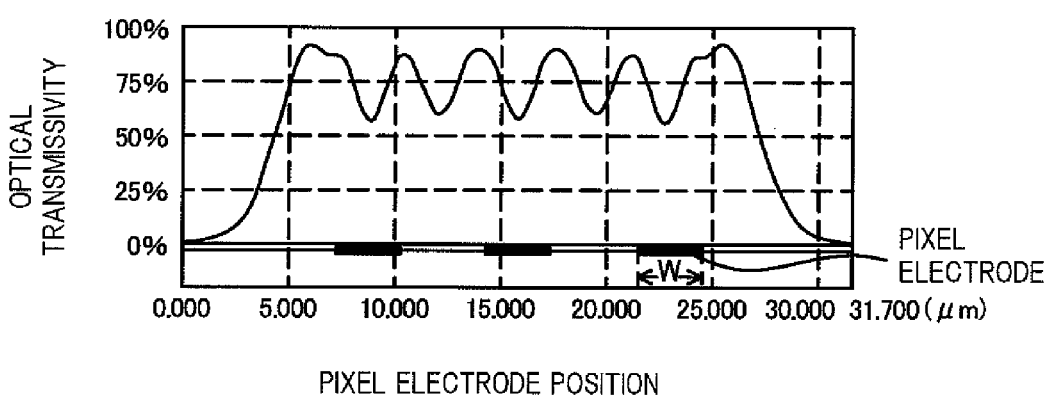
FIG. 7 is a graph showing optical transmissivity of an IPS-type liquid crystal display device.

FIG. 6 and FIG. 7 are views showing optical transmissivity of the IPS-type liquid crystal display device, wherein FIG. 6 shows the optical transmissivity in a case where the width W of the pixel electrode is large, and FIG. 7 shows the optical transmissivity in a case where the width W of the pixel electrode is small.

In FIG. 6 and FIG. 7, the optical transmissivity is taken on an axis of ordinates, and positions of the pixel electrodes are taken on an axis of abscissas. With respect to the counter electrode, in the same manner as FIG. 5, assume that the counter electrode is located below the pixel electrode by way of the insulation film. Further, assumes that the optical transmissivity of a liquid crystal layer when an ideal lateral electric field is generated is set to 100%. Here, FIG. 6 and FIG. 7 merely show the transmissivity of the liquid crystal layer, and other factors, for example, the optical transmissivity of color filters, the optical transmissivity of polarizers and the like are not taken into consideration.

As can be understood from FIG. 6 and FIG. 7, the formation of a lateral electric field in the vicinity of the center of the pixel electrode is difficult and hence, the optical transmissivity is lowered at the center of the pixel electrode.

FIG. 6 shows the optical transmissivity when an electrode width W is 7 µm. The liquid crystal element is controlled in an area in the vicinity of an edge portion of the pixel electrode where a lateral electric field is favorably formed and hence, the optical transmissivity of the area is approximately 90%. On the other hand, a lateral electric field is not favorably formed at a center portion of the pixel electrode and hence, the optical transmissivity is approximately 27%. Further, the optical transmissivity is also low in the vicinity of a center portion between the pixel electrodes and hence, the optical transmissivity is approximately 55 to 70%. To calculate the optical transmissivity in terms of 1 pixel, the optical transmissivity becomes approximately 55%.

FIG. 7 shows the optical transmissivity when the electrode width W is 3 µm. The liquid crystal element is controlled in an area in the vicinity of an edge portion of the pixel electrode where a lateral electric field is favorably formed and hence, in the same manner as the case where the pixel electrode width is large, the optical transmissivity of the area is approximately 90%. On the other hand, the pixel electrode width W in FIG. 7 is small and hence, the pixel exhibits the optical transmissivity of approximately 60% even at a center portion of the pixel electrodes where it is difficult to form a lateral electric field. Further, the optical transmissivity is 60% also in the vicinity of a center portion between the pixel electrodes. To calculate the optical transmissivity in terms of 1 pixel, the optical transmissivity becomes approximately 75%.

Figure 8:
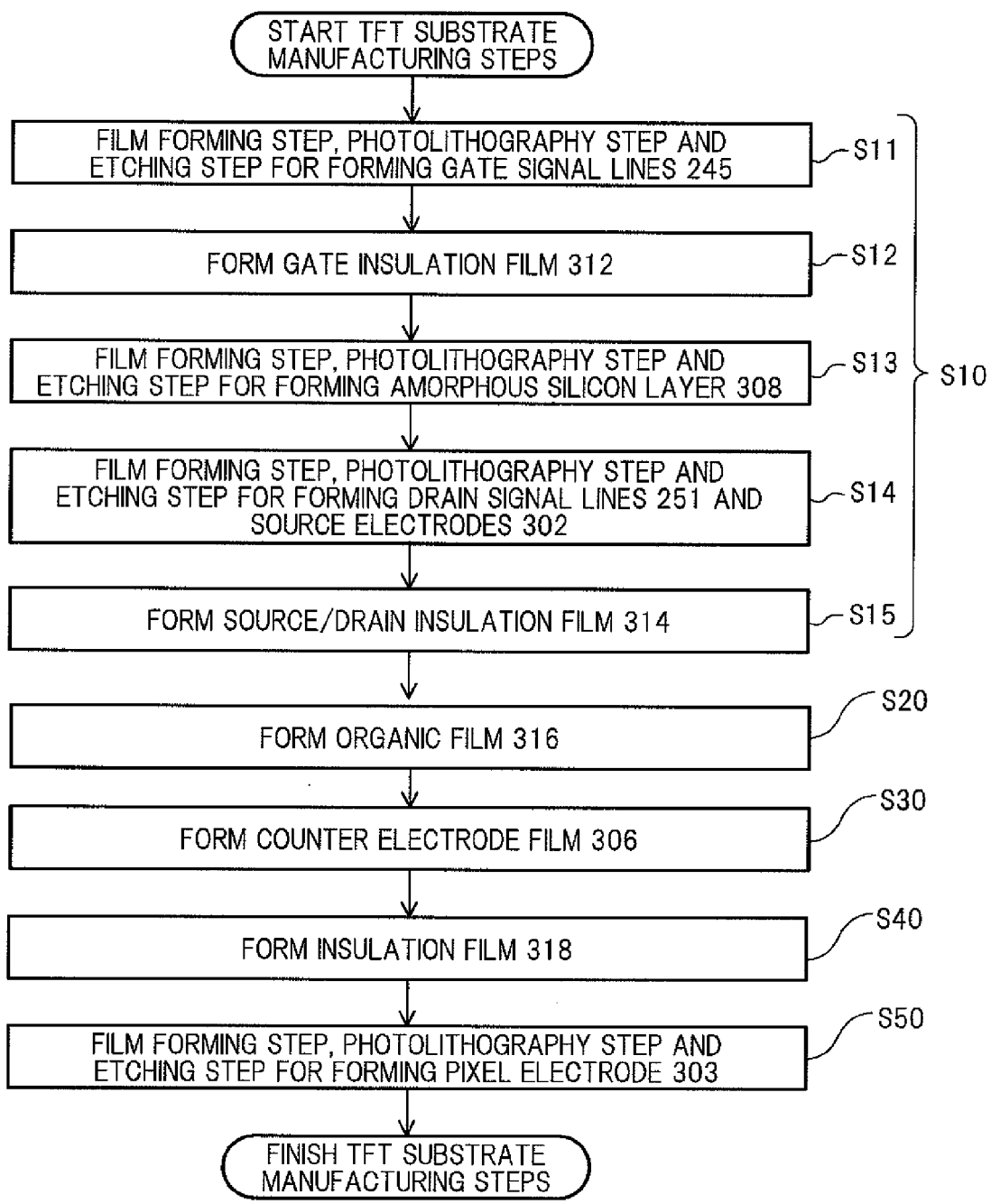
FIG. 8 is a flowchart schematically showing manufacturing steps of the TFT substrate in FIG. 4.

Although being the behavior peculiar to an IPS display mode, it is understood from FIG. 6 and FIG. 7 that when the width W of the pixel electrode is properly decreased, the optical transmissivity is increased. Particularly, the screen brightness is increased in accordance with an integrated value of the optical transmissivity and hence, the screen brightness is increased when the pixel electrode width W is made small FIG. 8 is a view for schematically showing manufacturing steps of the TFT substrate 230. Here, a film forming step, a photolithography step and an etching step are respectively performed using steps of a known semiconductor process and hence, the explanation of these steps is omitted.

In manufacturing the TFT substrate 230, firstly, the transistors 350 are formed in step S10. The step S10 is constituted of steps S11 to S15. Firstly, in step S11, the gate signal lines 245 are formed through the film forming step, the photolithography step and the etching step. Aluminum is mainly used as a material of the gate signal lines 245. Next, a gate insulation film 312 is formed in step S12 and, subsequently, an amorphous silicon layer 308 is formed through the film forming step, the photolithography step and the etching step in step S13.

Next, in step S14, drain signal lines 251 and source electrodes 302 are formed through the film forming step, the photolithography step and the etching step. Aluminum is mainly used as materials of these constitutional elements. Subsequently, in step S15, a source/drain insulation film 314 is formed thus forming transistors 350. Subsequently, in step S20, step S30 and step S40, an organic film 316, a counter electrode film 306 and an insulation film 318 are formed in this order respectively. Finally, in step S50, pixel electrodes 303 are formed through the film forming step, the photolithography step and the etching step.

As has been explained heretofore, the pixel electrode 303 can increase the capacitance due to the channel upper electrode 303C and hence, a stable potential can be held whereby the display quality can be enhanced.

Further, the capacitance of the pixel electrode 303 can be increased due to the channel upper electrode 303C and hence, a line width of the electrode in an opening portion can be decreased.

Accordingly, an area for forming a transparent electrode in the opening portion can be decreased and hence, the optical transmissivity can be enhanced leading to the enhancement of display quality.

Figure 9:
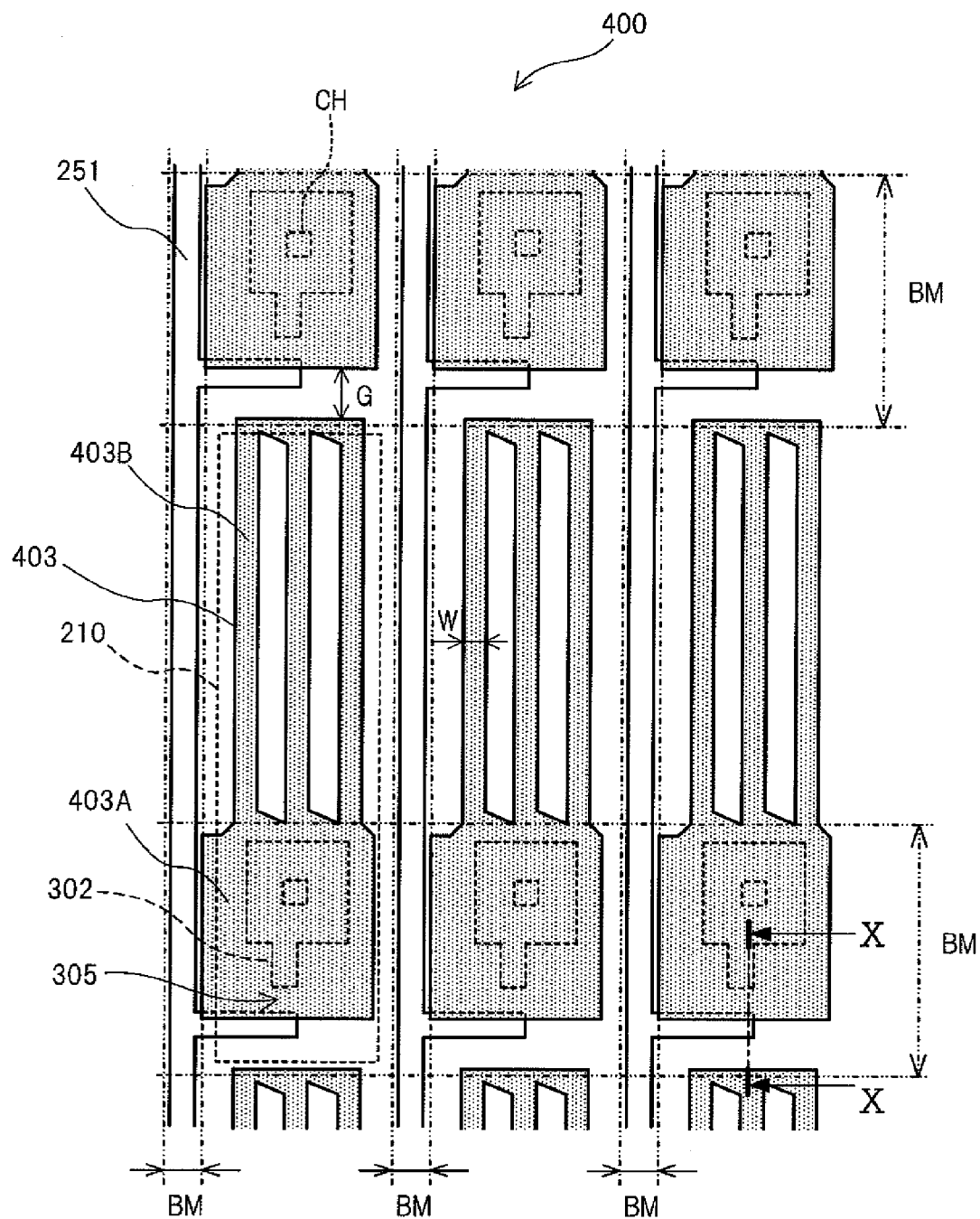
FIG. 9 is a enlarged schematic view of a TFT substrate according to a modification of the first embodiment.

FIG. 9 schematically shows a TFT substrate 400 according to a modification of the above-mentioned first embodiment in an enlarged manner. Except for that pixel electrodes are formed of pixel electrodes 403, the TFT substrate 400 is substantially equal to the TFT substrate 230 of the first embodiment, and hence, the explanation of parts similar to the parts in the first embodiment is omitted. The pixel electrode 403 is constituted of a contact-portion electrode 403A which is connected to a source electrode 302, and an opening-portion electrode 403B which is an electrode at an opening portion which is not covered with a black matrix.

Here, the contact-portion electrode 403A of the pixel electrode 403 extends to a channel portion 305 of a transistor of a pixel 210 thus increasing an area of the pixel electrode 403. To avoid the influence of noises generated in the contact-portion electrode 403A of a neighboring pixel, a predetermined distance G is ensured between the opening-portion electrode 403B and the contact-portion electrode 403A of the neighboring pixel. Further, since the area of the pixel electrode 403 is increased due to the contact-portion electrode 403A, a line width W of the opening-portion electrode 403B is made relatively small. Due to such a constitution, an area where the (transparent) electrode is formed is made small in the opening portion thus enhancing the optical transmissivity.

Figure 10:
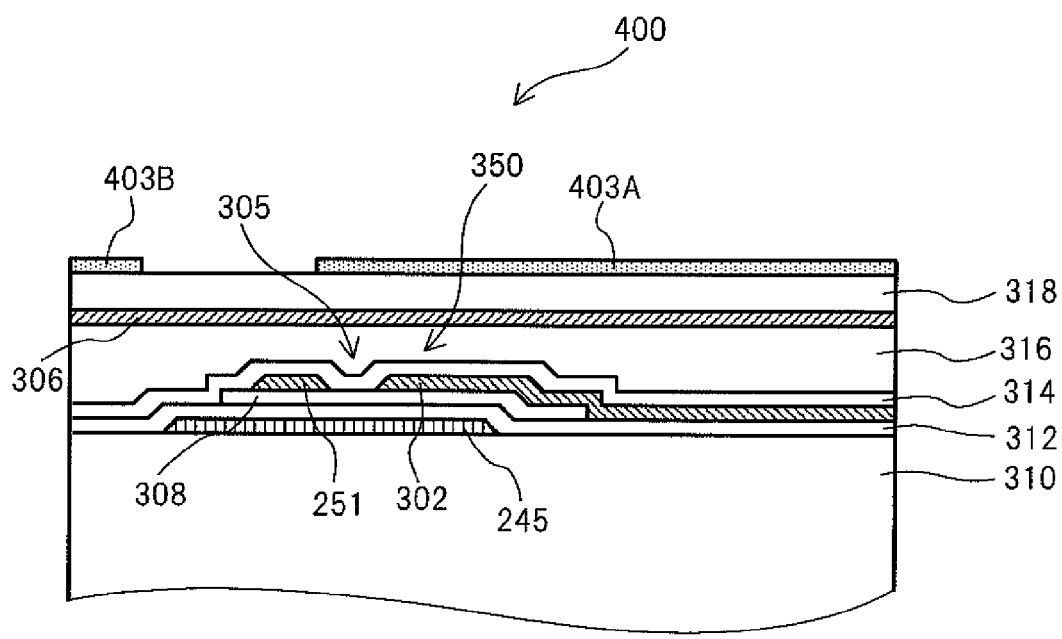
FIG. 10 is a cross-sectional view of a portion taken along a line X-X in FIG. 9.

FIG. 10 is a cross-sectional view of a portion taken along a line X-X in FIG. 9. Also in this drawing, except for that the pixel electrodes are formed of the pixel electrodes 403, the TFT substrate 400 is substantially equal to the TFT substrate 230 of the first embodiment and hence, the explanation of parts similar to the parts in the first embodiment is omitted. As shown in FIG. 10, although the contact-portion electrode 403A is located above the channel portion 305 of the transistor, a counter electrode 306 which is a conductive material is interposed between the contact-portion electrode 403A and the channel portion 305 and hence, the contact-portion electrode 403A is hardly influenced by noises of the transistor. Due to the provision of the contact-portion electrode 403A, the pixel electrode 403 can increase an area thereof, that is, the capacitance thereof without being influenced by noises.

That is, a counter electrode 306 which is a conductive film is located above the channel portion 305 by way of an insulation layer. Further, a portion of the pixel electrode 403 is located above the counter electrode 306 which constitutes the conductive film by way of an insulation film. The pixel electrode 403 is controlled by a thin film transistor provided with the channel portion 305 located below the pixel electrode 403.

Accordingly, the pixel electrode 403 can increase the capacitance thereof due to the contact-portion electrode 403A and hence a stable potential can be held thus enhancing the display quality.

Further, since the capacitance of the pixel electrode 403 can be increased due to the contact-portion electrode 403A, it is possible to decrease a line width of the electrode in an opening portion. Accordingly, an area where a transparent electrode is formed in an opening portion can be decreased and hence, the optical transmissivity can be increased leading to the enhancement of display quality.

Further, due to the above-mentioned constitution, a width of the pixel can be decreased thus realizing a high-definition liquid crystal display device.

Second embodiment

Figure 11:
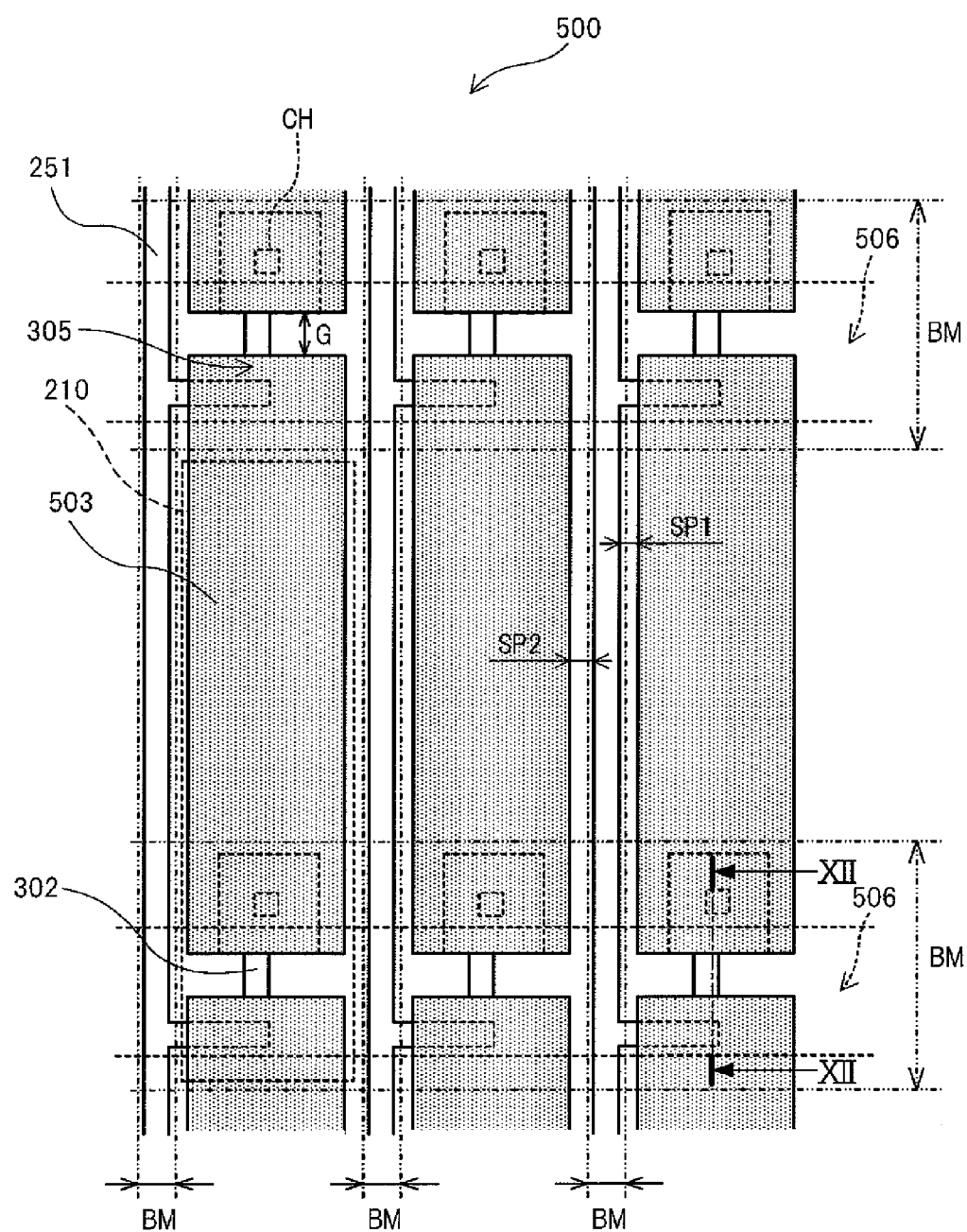
FIG. 11 is an enlarged schematic view of the TFT substrate according to one embodiment of the present invention.

FIG. 11 schematically shows a TFT substrate 500 according to one embodiment of the present invention in an enlarged manner. Here, the TFT substrate 500 includes drain electrodes, gate electrodes and semiconductor layers which constitute thin film transistors TFT. Further, the TFT substrate 500 includes pixel electrodes and holding capacitance electrodes which hold a potential of the pixel electrodes. While the pixel electrodes are mounted on the TFT substrate 500 side, counter electrodes are mounted on a color filter substrate which is located on a side opposite to the TFT substrate by way of a liquid crystal layer. The display device having such a constitution is a VA-method or TN-method liquid crystal display device. The repeated explanation of the constitution of the VA-method or TN-method TFT substrate which is substantially equal to the corresponding constitution of the IPS-method TFT substrate is omitted.

In FIG. 11, although the pixel of the TFT substrate 500 is provided with the pixel electrode 503, the pixel is not provided with the counter electrode. With respect to other constitutions of this embodiment, the repeated explanation of the constitution of the TFT substrate 500 of this embodiment which is substantially equal to the constitution of the TFT substrate 230 of the first embodiment is omitted. The pixel electrode 503 has a rectangular shape, extends to a channel portion 305 of a transistor of a neighboring pixel 210 thus increasing an area of the pixel electrode 503. Further, to prevent the pixel electrode 503 from being influenced by noises generated by the pixel electrode 503 of the neighboring pixel 210, a predetermined distance G is ensured between the pixel electrode 503 and the neighboring pixel electrode 503.

Further, in the same manner as the first embodiment, the pixel electrode may be formed so as to cover the channel portion 305 of the thin film transistor of the same pixel.

Here, gate signal lines, gate electrodes, a gate insulation film, semiconductor layers, and holding capacitance lines and holding capacitance electrodes to which a common potential is applied are not shown in the drawing. Further, the holding capacitance electrode is located in an overlapping manner with the pixel electrode with the insulation film sandwiched therebetween thus holding a potential of the pixel electrode.

In a case of the TN-method or VA-method liquid crystal display device, optical transmissivity is enhanced by enlarging a light transmitting region where the pixel electrode is formed. However, it is difficult for a conventional TN-method or VA-method liquid crystal display device to enlarge a pixel region. This is because when distances SP1, SP2 between the pixel electrode 503 and the drain signal lines 251 are narrowed, the pixel electrode is influenced by a change in voltage of the drain signal line. When a voltage of the pixel is changed, the optical transmissivity is changed so that an image is disturbed.

According to this embodiment, by increasing an area of the pixel electrode, it is possible to increase the holding capacitance. Further, the area of the pixel electrode can be increased in a region where light is blocked by the black matrix BM. By forming the holding capacitance electrode which forms the holding capacitance together with the pixel electrode in the light blocking region BM, it is possible to increase the holding capacitance without lowering the optical transmissivity.

According to the present invention, the distance SP1 between the pixel electrode and the drain signal line to which the pixel electrode is connected can be decreased. Further, the distance SP2 between the pixel electrode and the drain signal line on a column adjacent to the pixel electrode can be decreased.

Due to such a constitution, the holding capacitance of the pixel can be increased and hence, the distances SP1, SP2 can be decreased whereby the optical transmissivity can be enhanced. Further, due to the constitution of the present invention, it is possible to provide a high-definition liquid crystal display device.

Figure 12:
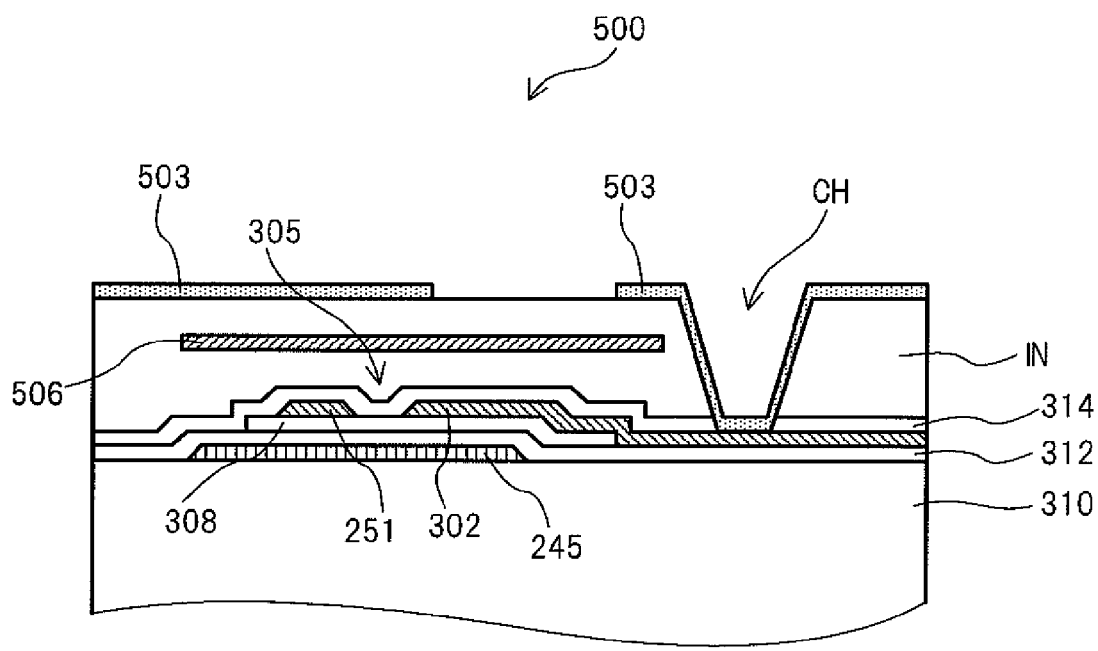
FIG. 12 is a cross-sectional view of a portion taken along a line XII-XII in FIG. 11.
Figure 13:
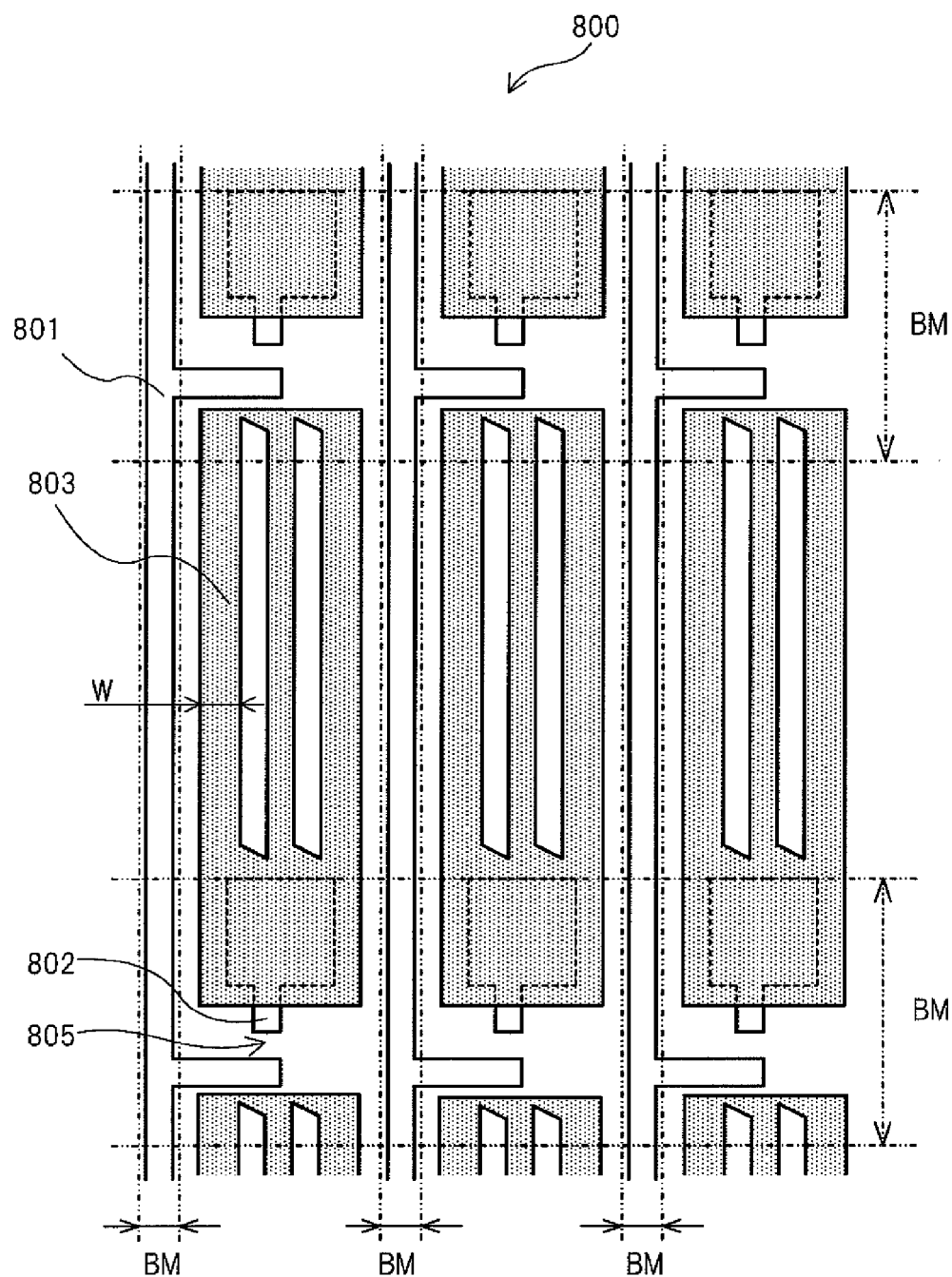
FIG. 13 is a view showing an arrangement state of drain signal lines, source electrodes and pixel electrodes formed on a conventional TFT substrate.

FIG. 12 is a cross-sectional view of a portion taken along a line VII-VII in FIG. 11. In the drawing, although the pixel electrodes 503 which are controlled by the thin film transistors TFT are mounted on the TFT substrate 500, the counter electrodes for driving liquid crystal are not mounted on the TFT substrate 500. Further, the conductive layer 506 is formed in the black matrix region. The explanation of parts substantially equal to the corresponding parts on the TFT substrate 230 of the first embodiment is omitted. As shown in FIG. 12, the pixel electrode 503 is located above the channel portion 305 of the transistor of the neighboring pixel 210. The conductive layer 506 which constitutes a conductive body is provided between the pixel electrode 503 and the channel portion by way of the insulation film IN and hence, the pixel electrode which extends over the channel portion 305 is hardly influenced by noises of the transistor. Accordingly, the pixel electrode 503 can increase an area thereof, that is, the capacitance thereof without being influenced by noises.

The conductive layer 506 extends in the direction perpendicular to a sheet surface of FIG. 12, and is located parallel to the gate signal line 245. Further, it is preferable to set a potential of the conductive layer 506 to a fixed value. For example, it is preferable to apply the same potential as a potential of the counter electrode to the conductive layer 506 thus ensuring the holding capacitance of the pixel.

Accordingly, the pixel electrode 503 can increase the capacitance thereof and hence, the pixel electrode 503 can hold the stable potential whereby the display quality of the liquid crystal display device can be enhanced.

Here, in the embodiment, the pixel electrode 503 extends to the channel portion 305 of the transistor of the neighboring pixel 210. However, the pixel electrode 503 may extend to the channel portion 305 of the transistor of the pixel 210 of the pixel electrode 503.

In the above-mentioned respective embodiments, the TFT substrate of the IPS method, the VA method or TN method is used.

However, other methods are applicable to the liquid crystal display device which controls liquid crystal composition by the TFT substrate.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device having a thin film transistor substrate, the thin film transistor substrate comprising:
   pixel electrodes arranged in pixels for controlling the alignment of a liquid crystal composition by applying a voltage thereto;
   thin film transistors which operate as switches for applying the voltage to the pixel electrodes wherein each of the thin film transistors includes a source-drain path including a source connected to a source electrode and a source electrode contact portion, a drain, and a channel portion extending between the source and the drain; and
   a conductive layer which is formed in a different layer at a different level from the pixel electrodes;
   wherein each of the pixel electrodes includes:
      a contact portion electrode which is connected to the source electrode and is formed to be smaller in contact area than the source electrode contact portion;

an upper channel portion electrode which is formed so as to substantially completely cover an entire channel length of the channel portion of the adjacent one of the pixels;

an opening portion electrode which has a plurality of electrode lines, each of which has a line width and connects the contact portion electrode and the upper channel portion electrode; and the contact portion electrode, the opening portion electrode and the upper channel portion electrode are located relative to one another in series so that the contact portion electrode is connected to the upper channel portion electrode through the opening portion electrode.

2. The liquid crystal display device according to claim 1, wherein the conductive layer comprises a counter electrode which covers a display region where the pixels are allocated and forms a holding capacitance together with each of the pixel electrodes.

3. The liquid crystal display device according to claim 1, wherein the conductive layer is formed in a light blocking region which blocks light from boundaries of the pixels.

4. The liquid crystal display device according to claim 1, wherein the conductive layer is located between the channel portion and the one of the pixel electrodes that covers the channel portion.

5. The liquid crystal display device according to claim 1, further comprising a black matrix formed to include first and second edges, wherein, between the first and second edges, the black matrix extends to cover a first portion of one of the pixel electrodes and a second portion of an adjacent one of the pixel electrodes.

6. The liquid crystal display device according to claim 1, wherein the contact portion electrode overlaps the source electrode contact portion in a plan view.

7. A liquid crystal display device including gate signal lines extending in a first direction; drain signal lines extending in a second direction; and pixel electrodes formed on a substrate and arranged in pixels, comprising:

a plurality of thin film transistors, each of said thin film transistors being comprised of a gate electrode which is connected to the gate signal line, a drain electrode which is connected to the drain signal line, a source electrode connected to a source electrode portion and a semiconductor layer including a source, a drain and a channel portion located between the source and drain, and wherein an insulation film, a conductive film which is formed in a different layer at a different level, and one of the pixel electrodes are located on each of the thin film transistors formed on the substrate in such an order from a thin film transistor side, and wherein each of the pixel electrodes includes:

a contact portion electrode which is connected to the source electrode and is formed to be smaller in contact area than the source electrode contact portion;

an upper channel portion electrode which is formed so as to substantially completely cover an entire channel length of the channel portion of the adjacent one of the pixels;

an opening portion electrode which includes a plurality of electrode lines, each of which has a line width and connects the contact portion electrode and the upper channel portion electrode; and the contact portion electrode, the opening portion electrode and the upper channel portion electrode are located relative to one another in series so that the contact portion electrode is connected to the upper channel portion electrode through the opening portion electrode.

8. The liquid crystal display device according to claim 7, further comprising a black matrix formed to include first and second edges, wherein, between the first and second edges, the black matrix extends to cover a first portion of one of the pixel electrodes and a second portion of an adjacent one of the pixel electrodes.

9. The liquid crystal display device according to claim 7, wherein the contact portion electrode overlaps the source electrode contact portion in a plan view.

10. A method of manufacturing a thin film transistor substrate used in a liquid crystal display device, the method comprising the steps of:

forming thin film transistors which operate as switches for applying a voltage to pixel electrodes arranged in pixels wherein each of the thin film transistors includes a source-drain path including a source connected to a source electrode and a source electrode contact portion, a drain, and a channel portion extending between the source and the drain;

forming a conductive layer which is formed in a different layer at a different level from the pixel electrodes such that the conductive layer covers a channel portion of each of the thin film transistors by way of an insulation film after the formation of the thin film transistors; and after the formation of the conductive layer, forming pixel electrodes which control the alignment of a liquid crystal composition by applying a voltage by way of an insulation film, wherein a contact portion electrode which connects the pixel electrode and the source electrode, and which is formed to be smaller in contact area than the source electrode contact portion, and wherein each of the pixel electrodes includes:

a contact portion electrode which is connected to the source electrode and is formed to be smaller in contact area than the source electrode contact portion;

an upper channel portion electrode which is formed so as to substantially completely cover an entire channel length of the channel portion of the adjacent one of the pixels;

an opening portion electrode which has a plurality of electrode lines each of which has a line width and connects the contact portion electrode and the upper channel portion electrode; and the contact portion electrode, the opening portion electrode and the upper channel portion electrode are located relative to one another in series so that the contact portion electrode is connected to the upper channel portion electrode through the opening portion electrode.

11. The method according to claim 10, further comprising forming a black matrix having first and second edges so that the portion of the black matrix between the first and second edges covers the first portion of one of the pixel electrodes and the second portion of an adjacent one of the pixel electrodes.

12. The liquid crystal display device according to claim 10, wherein the contact portion electrode overlaps the source electrode contact portion in a plan view.

* * * * *